United States Patent [19]

Suzuki

[11] Patent Number: 4,488,104

[45] Date of Patent: Dec. 11, 1984

[54] POWER SOURCE APPARATUS FOR A FLASH LAMP USED IN A PULSE LASER APPARATUS

[75] Inventor: Masaharu Suzuki, Ootawara, Japan

[73] Assignee: Tokyo Shibaura Denki Kabushiki Kaisha, Japan

[21] Appl. No.: 441,743

[22] Filed: Nov. 15, 1982

[30] Foreign Application Priority Data

Nov. 13, 1981 [JP] Japan ............................ 56-181805

[51] Int. Cl.[3] ............................ H02J 15/00

[52] U.S. Cl. ............................ 320/1; 307/51

[58] Field of Search ............................ 307/44, 51; 320/1; 363/126

[56] References Cited

U.S. PATENT DOCUMENTS

| | | | |
|---|---|---|---|
| 3,666,964 | 5/1972 | Flynn | 320/1 X |
| 3,757,795 | 9/1973 | Anderson | 320/1 X |
| 3,805,143 | 4/1974 | Tauerin et al. | 320/1 X |

*Primary Examiner*—William M. Shoop
*Attorney, Agent, or Firm*—Finnegan, Henderson, Farabow, Garrett & Dunner

[57] ABSTRACT

A power source apparatus for a flash lamp used in a pulse laser apparatus including a plurality of condensers, a plurality of rectifiers connected to the condensers and defining discharge paths for the condensers wherein the discharge of certain of the condensers is delayed due to reverse biasing of the rectifiers.

4 Claims, 9 Drawing Figures

POWER SOURCE APPARATUS FOR A FLASH LAMP USED IN A PULSE LASER APPARATUS

FIELD OF THE INVENTION

This invention relates to a pulse solid laser apparatus and, more particularly, to a power source apparatus for a flash lamp used in such a pulse laser apparatus.

BACKGROUND OF THE INVENTION

Recently, solid laser apparatus have been developed which excites a laser medium rod by illumination from a flash lamp, such as a Xenon discharge tube. These apparatus operate such that a condenser is charged by a high direct current voltage applied through a resistor. The voltage charge of the condenser is then discharged all at once by applying a trigger pulse to a flash lamp connected across that condenser.

However, such apparatus have a disadvantage in that the discharge property of the flash lamp, more importantly the pulse waveform of resulting laser light, is fixed by electrical properties peculiar to the flash lamp and by electrical properties peculiar to the discharge property of the condenser, so that the pulse waveform of the resultant laser light is limited to one form.

FIG. 1 illustrates a typical conventional supply device. In FIG. 1 an A.C. input voltage is increased to several KV by an A.C. transformer 1. This increased voltage, after rectifying by a rectifier 2, is supplied to a condenser 4 through a resistor 3. A resultant D.C. high voltage is charged in condenser 4.

The charge voltage of condenser 4 is subsequently supplied between an anode and cathode of a flash lamp (not shown) which is electrically connected across condenser 4. A flash lamp is a kind of discharge tube, and its discharge is carried out only upon issue of a trigger pulse thereto. Thus, the supplied high D.C. voltage continues to charge condenser 4 until discharge occurs upon triggering of the flash lamp.

In such a discharge procedure, the charge voltage of condenser 4 is gradually increased up to a desired voltage value of, for example, several kV as shown in the saturation curve of FIG. 2.

The flash lamp is discharged when a trigger pulse is applied thereto, whereupon the charge voltage of condenser 4 is discharged across the anode and cathode of the flash lamp. Accordingly, the flash lamp immediately emits light to energize a solid laser rod which is disposed in the vicinity of the flash lamp, whereby laser light is generated from the laser rod.

A typical waveform of discharge current of condenser 4 is shown in FIG. 3 to abruptly rise and to slowly descend after reaching a peak value. The peak value of current may be several hundred to several thousand amperes and the discharge time may typically be less than several milliseconds, although those values may vary with supply voltage, kinds of flash lamp or the like.

Generally, the energizing light emitted from a flash lamp is maximized by setting the charge voltage of condenser 4 to a high value, whereby the peak value of laser output is maximized. The laser output value is somewhat changeable by adjustment of the charge voltage level. However, it is difficult to arbitrarily change the pulse width of a laser output because the discharge property of condenser 4 is fixed, as is the performance of the flash lamp itself, as aforementioned.

If the electric charge value of condenser 4 is fixed, the emission light achieved by that electric charge value is also fixed. However, if the light emission is short in time, and the intensity of the light is thereby strong, the laser light generated by that light emission becomes greater. To the contrary, if the light emission time is increased, and the intensity of the light is thereby diluted, the laser light generated by that light emission is reduced.

Since the level of the peak value of laser light corresponds to the level of the instant energy of laser light, even if the total amount of laser light energy per pulse is the same, the higher the peak value is, the higher the instant light energy is. Therefore, in a laser apparatus, if the pulse width of laser output is variable, it is possible to utilize laser light of a variety of peak values, as required.

In the circuit of FIG. 1, since the charging voltage of the condenser is constant and the discharge property is fixed, it is impossible to vary the pulse width of laser output light. However, circuits as shown in FIGS. 4 and 5, do operate to change the pulse width by discharging a plurality of condensers with sequential delay times using delay circuits.

These delay circuits utilize either a ladder-type circuit of FIG. 4 construction with inductances 41, 42, and 43, and capacitances 44, 45, and 46, or a ladder-type circuit of FIG. 5 construction with resistances 51, 52, and 53, and capacitances 54, 5, and 56. A D.C. high voltage is applied between input terminals 50*a* and 50*b* of such circuits to charge the capacitances. A flash lamp is connected between output terminals 57*a* and 57*b*.

Subsequently, upon applying a trigger to the flash lamp, in the case of FIG. 4, the charge of capacitance 46 nearest to the output terminals 57*a* and 57*b* is first discharged to flow into the flash lamp. At this time, although the charge of the second capacitance 45 is also urged to discharge, its discharge is restrained by function of the inductances 42 and 43. Discharge of capacitance 45 is instead started with a delay determined by a time constant which is a function of the component values. The second capacitance 45 and first capacitance 44 subsequently discharge at times delayed from the discharge starting time of capacitance 46, whereby the total discharge time is lengthened and the pulse width of discharge current flowing to the flash lamp is increased.

The operation of the circuit shown in FIG. 5 is similar. The discharge of capacitance 56 is carried out first. The discharge of capacitance 55 is delayed from the discharge of capacitance 56 by a time constant which is determined by the relation of resistances 53 and 52. The discharge of capacitance 54 is similarly delayed, so that the total discharge time is long and, accordingly, the pulse width of the laser output is long.

It is thus possible to control the pulse width to a desired value by selecting the values of inductances 41, 42, and 43 (FIG. 4) or resistances 51, 52, and 53 (FIG. 5).

However, in the circuit of FIG. 4, a large current of hundreds to thousands of amperes flows, so that the current capacity of inductances 41, 42, and 43 must be large. This results in large problems regarding the volume and weight of inductances 41, 42, and 43. Furthermore, in order to increase the current capacities of inductances 41, 42, and 43, the inductances 41, 42, and 43, should be made of a hollow core type. Consequently, in order to obtain sufficient inductance capacity, winding turns must be great, inviting large size and high cost.

In the case of the circuit of FIG. 5, since current as large as hundreds to thousands of amperes flows in resistances 51, 52, and 53, these resistances must have large current capacities. Therefore, the resulting device is large as well as expensive and energy loss is great due to such resistance, resulting in decreased efficiency.

It is, therefore, an object of this invention to provide a power source apparatus for a flash lamp used in a pulse laser apparatus which can supply a variable width pulse of current to a flash lamp without energy loss.

More specifically, it is an object of the invention to provide a compact, inexpensive power source apparatus for a flash lamp used in a pulse laser apparatus.

Additional objects and advantages of the invention will be set forth in part in the description which follows, and in part will be obvious from the description, or learned by practice of the invention. The objects and advantages of the invention may be realized and obtained by means of the instrumentalities and combinations particular pointed out in the appended claims.

SUMMARY OF THE INVENTION

To achieve the foregoing objects, and in accordance with the purposes of the invention as embodied and broadly described herein, a power source for a flash lamp employed to excite a pulse laser apparatus is provided which comprises: (a) an output terminal for coupling to the flash lamp; (b) a plurality of condensers; (c) means for charging each of the condensers to a different D.C. voltage; and (d) unidirectional current means for selectively couplying the condensers to the output terminal, the unidirectional current means being connected to prevent discharge of a given condenser until the greatest charge on any one of the condensers is substantially equal to or less than the charge on the given condenser.

Preferably, a plurality of diodes is employed with each connected to couple one of the condensers to the output terminal to thereby define parallel discharge paths from the condensers to the output terminal, the diodes being oriented to prevent discharge of a given condenser until the greatest charge on any one of the condensers is substantially equal to or less than the charge on the given condenser.

In an alternative preferred embodiment, a plurality of diodes is coupled in series and the series is connected to couple the condensers to the output terminal with each condenser being separated from another condenser by at least one of the diodes. The diodes are oriented to prevent discharge of a given condenser until the greatest charge on any one of the condensers is substantially equal to or less than the charge on the given condenser.

Moreover, a D.C. power source used to charge the condensers may have variable D.C. output voltages.

BRIEF DESCRIPTION OF THE DRAWINGS

The accompanying drawings, which are incorporated in and constitute a part of the specifications, illustrate preferred embodiments of the invention and, together with the general description of the invention given above, and the detailed description of preferred embodiments given below, serve to explain the principles of the invention.

DESCRIPTION OF THE PREFERRED EMBODIMENTS

Reference will now be made in detail to the present preferred embodiments of the invention as illustrated in the accompanying drawings.

Figure 1:
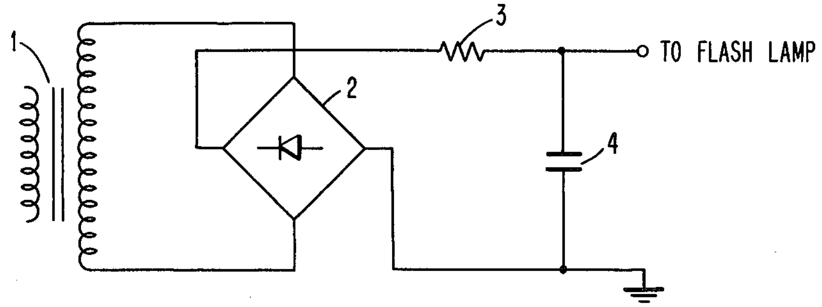
Fig. 1 PRIOR ART
FIG. 1 is a circuit diagram illustrating a conventional apparatus.
Figure 2:
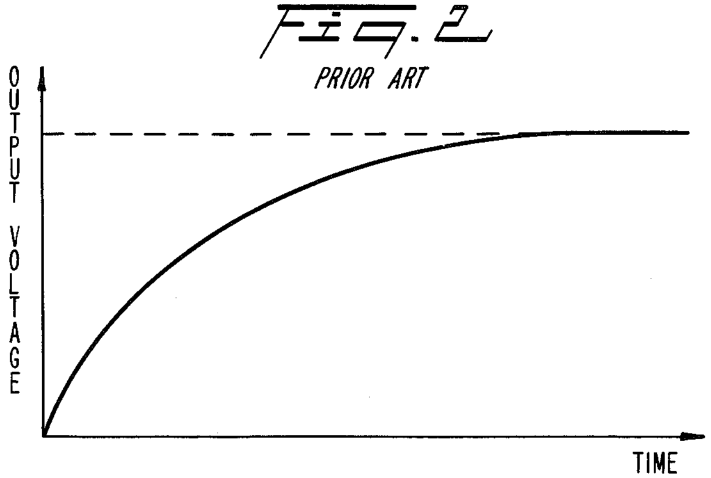
Fig. 2 PRIOR ART
FIG. 2 is a chart illustrating the charging property of the condenser of FIG. 1.
Figure 3:
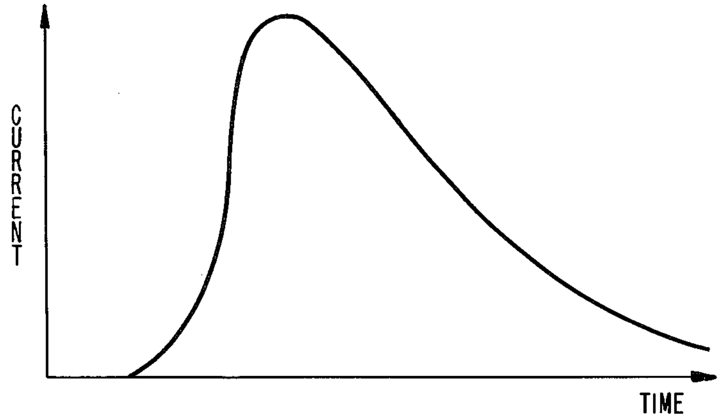
Fig. 3 PRIOR ART
FIG. 3 is a chart illustrating a discharge waveform when the charge voltage of the condenser of FIG. 1 is discharged through a flash lammp.
Figure 4:
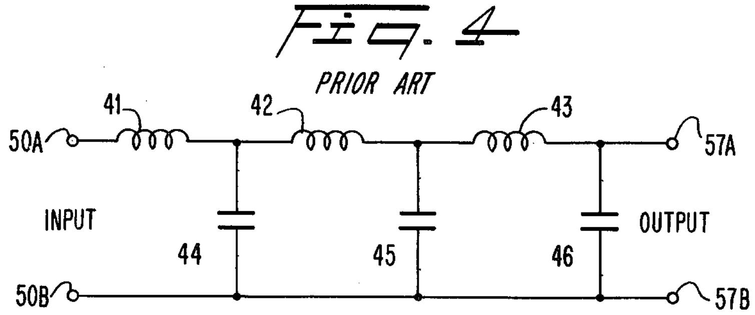
FIG. 4 PRIOR ART
FIG. 4 and 5 are circuit diagrams illustrating conventional delay circuits.
Figure 5:
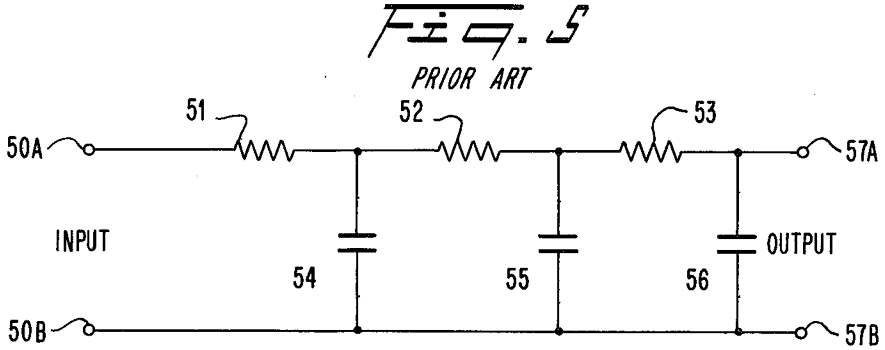
FIG. 5 PRIOR ART
Figure 6:
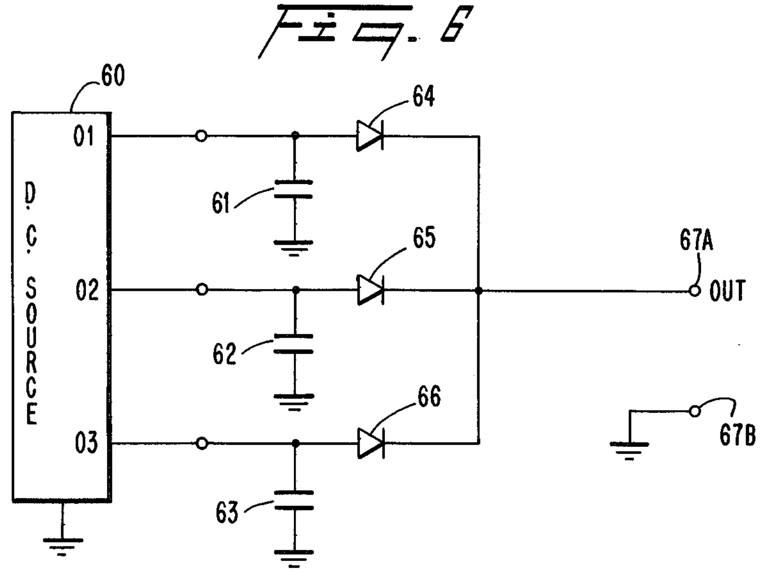
FIG. 6 is a circuit diagram illustrating one embodiment of the subject invention.

Referring to FIG. 6, there is shown a D.C. source apparatus 60 which generates, for example, three different levels of D.C. voltage at output terminals 01, 02, and 03, respectively. The D.C. outputs provided at output terminals 01, 02, and 03 may be varied relative to each other by operation of an output adjusting knob (not shown). One terminal of condensers 61, 62, and 63 is connected to the output terminals 01, 02, and 03 of D.C. source 60, respectively, and another terminal of each condenser is grounded. Each output terminal 01, 02, and 03 of D.C. source 60 is also connected to a first master output terminal 67*a* through diodes 64, 65, and 66, respectively. A second master output terminal 67*b* is grounded. It is to be understood that two or more than three condensers may also be employed in connection with the circuit of FIG. 6.

In the device constructed as described above, a flash lamp is connected between master output terminals 67*a* and 67*b*. With different D.C. voltages supplied to condensers 61, 62, and 63 from D.C. source 60 through series connected charge resistors (not shown), each charge voltage of condensers 61, 62, and 63 is zero at an initial time. These condensers are then charged at rates determined by individual time constants, which time constants are established by the values of each condenser and by the value of each charge resistor connected thereto.

If the D.C. voltage levels applied to condensers 61, 62, and 63 are $E_1$, $E_2$, and $E_3$, respectively, whereby $E_1 > E_2 > E_3$, the discharge starting order of condensers 61, 62, and 63 is condenser 61 first, condenser 62 next and condenser 63 last, when a discharge is initialized by a trigger pulse being applied to the flash lamp connected across master output terminals 67*a* and 67*b*.

To accomplish this result, diodes 64, 65, and 66 are connected in a positive direction to the condensers 61, 62, and 63, respectively. The charge voltages of condensers 61, 62, and 63 are different, due to the inequality of $E_1$, $E_2$, and $E_3$ and/or the inequality of the time constants relative to each condenser. Accordingly, immediately before discharge initialization, the diodes 64, 65, 66 connected to the condensers 62, 62, 63 having a low charge voltage are in a reverse biased state. For example, if the charge voltages across condensers 61, 62, and 63 are $V_1$, $V_2$, and $V_3$, respectively, with $V_1 > V_2 > V_3$, then diode 64 is forward biased, but diodes 65 and 66 are reversed biased until $V_1$ is discharged to $V_2$ and $V_3$, respectively. The discharge of condensers 61, 62, and 63 proceeds as the voltage level of condenser 61 discharges to the charge voltage of condenser 62, whereby diode 65 becomes connected in a positive direction and condenser 62 begins discharging. Accordingly, diode 65 becomes forward biased so that both condensers 61 and 62 discharge their charged voltage. Furthermore, when the charge voltages of both condensers 61 and 62 discharge to the charge voltage level of condenser 63, diode 66 becomes forward biased so that all of condensers 61, 62, and 63 discharge their charged voltage.

As described above, the discharge initiation of each condenser 61, 62, and 63 is shifted on a time axis. Accordingly, since the discharge time is increased, the pulse width of current flowing to the flash lamp is increased and, consequently, the energizing light output emitted from the flash lamp also is increased in correspondence to that pulse width.

According to the above described device, since diodes are employed for discharge control, there is little energy loss. In addition, since the control of discharge time length is determined by the charge voltage value of each condenser, the discharge time length can be easily controlled simply with control of charge voltage values. Furthermore, it is possible to control the discharge time length by increasing the number of pairs of condensers and diodes used as well and by selecting the value of the condensers employed.

Figure 7:
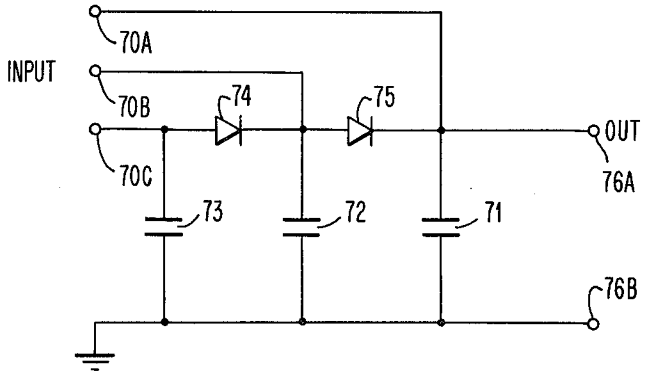
FIG. 7 is a circuit diagram illustrating another embodiment of the subject invention.

Turning now to FIG. 7, there is shown a ladder-type circuit in which condensers 71, 72, and 73 are connected between input terminals 70*a*, 70*b*, and 70*c*, respectively, and ground. Diode 74 is connected between terminals 70*c* and 70*b*, while diode 75 is connected between terminals 70*b* and 70*a*. Diode 75 is oriented to be reversed biased when the charge on condenser 71 is greater than the charge on condenser 72, and diode 74 is oriented to be reversed biased when the charge on condenser 72 is greater than the charge on condenser 73. Although three condensers are employed in the device of FIG. 7, two or greater than three condensers may be employed with the corresponding number of diodes being one less than the numbers of condensers.

If D.C. voltages $E_1$, $E_2$, and $E_3$ are now applied from a D.C. source to input terminals 70*a*, 70*b*, and 70*c*, respectively, the voltage $E_1$ applied to the input terminal 70*a* is charged in the condenser 71 close to output terminal 76*a*, the voltage $E_2$ is charged in the condenser 72 and the voltage $E_3$ is charged in the condenser 73. Individual charging resistors may be employed in the same manner as in the circuit of FIG. 6. Voltages $E_1$, $E_2$, and $E_3$ should be as follows: $E_3 < E_2 < E_1$.

It is presumed that a flash lamp is connected between the output terminals 76*a* and 76*b*. When the discharge of that flash lamp is initiated by a trigger pulse being applied thereto, the discharge of condenser 71 is first started. Since diodes 74 and 75 are connected in the positive direction between condensers 71, 72, and 73, diodes 74 and 75 are reverse biased provided $E_1 > E_2 > E_3$. Accordingly, condensers 72 and 73 are electrically turned off by diodes 74 and 75, until the discharge of condenser 71 is reduced to $E_2$.

When a state of $E_1 = E_2$ is established by discharge of condenser 71, diode 75 connected between condensers 71 and 72 is forward biased so that the charge voltage of condenser 72 is permitted to start to discharge to output terminals 76*a* and 76*b* through diode 75. Since the initial charge voltage of condenser 73 then is lower than the initial charge voltage of condenser 72, diode 74 connected between condenser 72 and 73 is in reverse bias, and the charge of condenser 74 is not discharged.

Subsequently, when a state of $E_1 = E_2 = E_3$ is established by the discharge of condensers 72 and 71, the charge voltage of condenser 73 starts to discharge since diode 74 becomes forward biased, at which time, the charge from all the condensers is used to supply the flash lamp.

Since the discharge of each of the condensers is successively initiated, with a time interval in between, the entire discharge time is lengthened, as is the waveform of the resultant flash lamp energizing light.

Figure 8A:
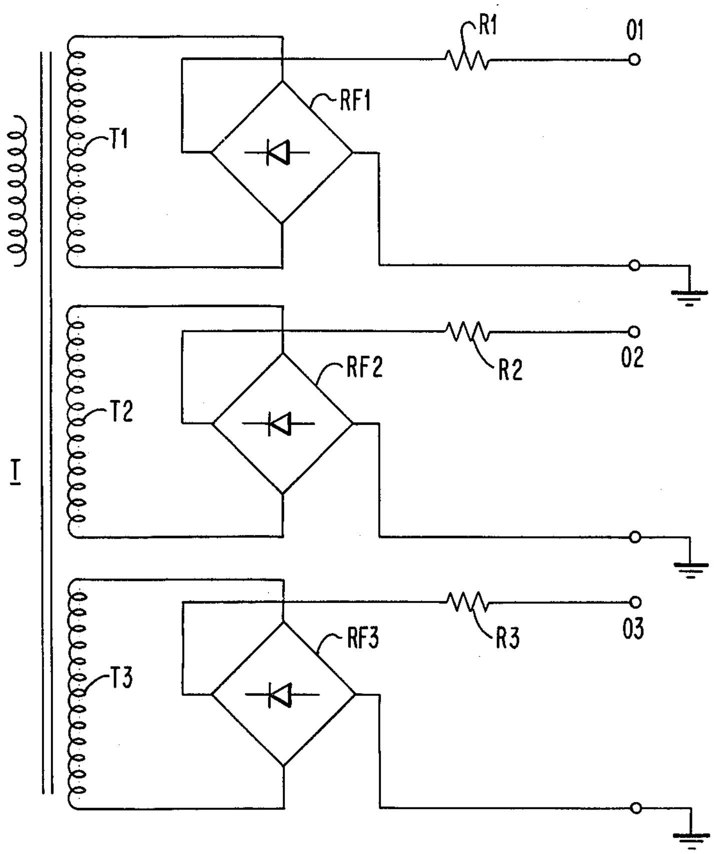
FIGS. 8(*a*) and (*b*) are circuit diagrams illustrating examples of D.C. source apparatus for FIG. 6 or 7.
Figure 8B:
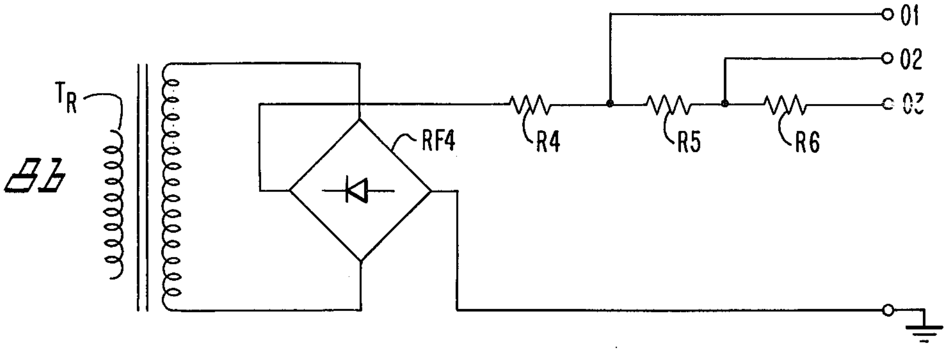

Representative constructions of the D.C. source 60 are illustrated in FIGS. 8(*a*) and (*b*).

The device of FIG. 8(*a*) employs a step-up transformer T having secondary windings $T_1$, $T_2$, and $T_3$ for obtaining a number of D.C. source outputs corresponding to the number of condensers to be used. Rectifying circuits $RF_1$, $RF_2$, and $RF_3$ are connected to each of secondary windings $T_1$, $T_2$, and $T_3$, respectively. The negative output terminals of rectifying circuit $RF_1$, $RF_2$, and $RF_3$ are grounded and each of their positive output terminals is connected to output terminals 01, 02, and 03 through charging resistors $R_1$, $R_2$, and $R_3$, respectively. Also, secondary windings $T_1$, $T_2$, and $T_3$ are provided with different winding ratios so as to provide different output voltages to be rectified. Moreover, the output voltages of the output terminals 01, 02, and 03 are variable by controlling the input voltage of the primary winding. To control the output voltages, the turns ratio of secondary windings $T_1$, $T_2$, and $T_3$ may also be varied and the resistance values of charging resistors $R_1$, $R_2$, and $R_3$ might also be varied.

The device of FIG. 8(*b*) employs a step-up transformer TR having a single secondary winding. A rectifying circuit $RF_4$ is connected to the secondary output of transformer TR. The negative output terminal of rectifying circuit $RF_4$ is grounded and the positive output terminal is connected to the series connection of resistors $R_4$, $R_5$, and $R_6$. By such a construction, voltages proportional to the voltage dividing ratio of resistors $R_4$, $R_5$, and $R_6$ are provided from an output terminal 01 connected between the resistors $R_4$ and $R_5$, an output terminal 02 connected between the resistors $R_5$ and $R_6$ and an output terminal 03 connected to the other end of resistor $R_6$, respectively.

As should be apparent to those skilled in the art, modifications and variations can be made in the above disclosed embodiments without departing from the scope or spirit of the invention.

I claim:

1. A power source for a flash lamp employed to excite a pulse laser apparatus, comprising:
   - an output terminal for coupling to the flash lamp;
   - a plurality of condensers;
   - means for charging each of said condensers to a different D.C. voltage; and
   - a plurality of diodes, each connected to couple one of said condensers to said output terminal to thereby define parallel discharge paths from said condensers to said output terminal, said diodes being oriented to prevent discharge of a given condenser until the greatest charge on any one of said condensers is substantially equal to or less than the charge on said given condenser.

2. The power source of claim 1 wherein said means for charging is a D.C. power source having a plurality of different output voltages.

3. A power source for a flash lamp employed to excite a pulse laser apparatus, comprising:

an output terminal for coupling to the flash lamp;

a plurality of condensers;

means for charging each of said condensers to a different D.C. voltage, and a plurality of diodes coupled in series, said series being connected to couple said condensers to said output terminal with each condenser being separated from another condenser by at least one of said diodes, the condenser coupled closest to the output terminal designed to be charged to the highest D.C. voltage level, and the remainder of the condensers designed to be charged to D.C. voltage levels which are progressively lower as the condensers are progressively coupled back from said closest-coupled condenser, said diodes being oriented to prevent discharge of a given condenser until the greatest charge on any one of said condensers is substantially equal to or less than the charge on said given condenser.

4. The power source of claim 3 wherein said means for charging is a D.C. power source having a plurality of different output voltages.

* * * * *